R. H. CLARK.
WHEEL.
APPLICATION FILED OCT. 8, 1917.

1,354,466.

Patented Oct. 5, 1920.

INVENTOR
R. H. Clark
BY
ATTYS

UNITED STATES PATENT OFFICE.

ROBERT HIRD CLARK, OF WINNIPEG, MANITOBA, CANADA.

WHEEL.

1,354,466.     Specification of Letters Patent.     Patented Oct. 5, 1920.

Application filed October 8, 1917. Serial No. 195,421.

*To all whom it may concern:*

Be it known that I, ROBERT HIRD CLARK, of the city of Winnipeg, Province of Manitoba, Canada, have invented certain new and useful Improvements in Wheels, of which the following is the specification.

The invention relates to improvements in wheels, particularly automobile and truck wheels and the object of the invention is to provide a non-puncturable, easy riding resilient wheel which can be readily assembled or dismounted and which is constructed to take up the various thrusts, both lateral and vertical to which it may be subjected.

With the above object in view the invention consists essentially in a hub, opposing spaced side plates secured to the axle and provided with spaced concentrically arranged channels, a disk surrounding and spaced from the hub and positioned centrally between plates and provided with concentrically arranged channels opposing the former channels, rings of resilient material inserted between the disk and the plates at the channels, fastening bolts connecting the side plates and passing through suitably positioned openings provided in the edge of the disk, the parts being arranged and constructed as hereinafter more particularly described and later pointed out in the appended claim, reference being had to the accompanying drawing, in which:—

In the drawing like characters of reference indicate corresponding parts in the several figures.

Figure 1:
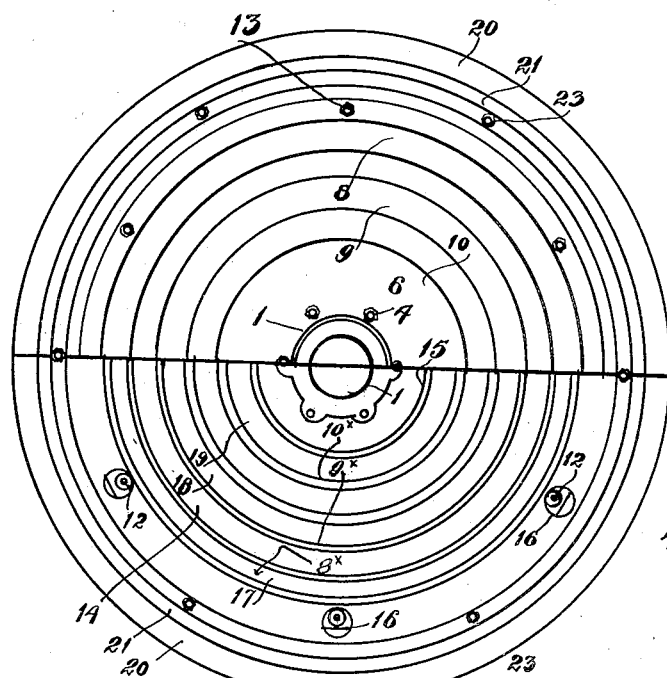
Figure 1 represents a side view of a wheel constructed in accordance with my invention and with the lower half of the side plate removed to expose interior construction.

1 represents the hub of the wheel which is cast with a pair of spaced outstanding circumscribing flanges 2 and 3. To the flanges I secure such as by bolting, as indicated at 4 and 5, a pair of spaced circular side plates 6 and 7 which are provided with opposing concentrically arranged channels 8, 8′, 9, 9′, 10 and 10′, these being formed in the present instance by rolling or casting the channels in the plates, depending on whether they are sheet metal or cast.

The outer edges of the plates are provided with suitably spaced mating collars 11 and 12 through which the outer edges of the plates are fastened together by means of bolts 13. These plates form a casing which supports in a resilient manner a central disk 14 provided with a central opening 15 entirely free of and surrounding the hub and with suitably positioned circularly arranged openings 16 admitting of the fastening at the bosses, it being noticed that there is ample clearance provided by these openings to allow of the movement of the disk in respect to the plates. Channels $8^x$, $9^x$ and $10^x$ are also formed on the faces of the disk directly opposing those of the plates.

The disk is resiliently suspended from the plates by rings of resilient material 17, 17′, 18, 18′, 19 and 19′ interposed between the opposite sides of the disk and the plates and positioned in the channels. These rings are substantially rectangular in cross section, are positioned concentric to the hub and are preferably formed from rubber.

In building the wheel it is desirable to have a slight compression in these rings by jamming the plates on them when they are bolted up. This serves positively to hold the rings and prevent any slip or creeping between the disk and the rings or the side plates and the rings.

Here I wish it to be noticed that the channels 8, 8′, 9, 9′, 10 and 10′ are relatively deep, are wider than the rings, and have their sides beveled, while the channels $8^x$, $9^x$ and $10^x$ are relatively shallow and are not larger than the rings. This arrangement permits of the tight fitting or hugging of the rings by the channels $8^x$, $9^x$ and $10^x$ to prevent any movement or bending of the rings at this point, while it allows a lateral movement or bending of the sides of the rings in the channels 8, 8′, 9, 9′, 10 and 10′.

The outer edge of the disk, which, it will be observed, extends beyond the outer edges of the plates, carries the wheel tread 20 which is preferably formed from rubber and is held in position by lapping clamping plates 21 and 22, bolted at 23, to the periphery of the disk.

Considering this wheel mounted rotatably on an axle inserted within the hub it will be obvious that the weight brought on the axle will be transmitted through the resilient rings to the tread and that when operating on the road all the various stresses will be absorbed by the rings which will take up not only vertical but lateral shock.

The openings 15 and 16 obviously allow of the free play of the disk inwardly and outwardly.

While the device has been shown with the side flanges fixed and the disk floating it will be readily understood that the reverse construction could be employed without departing in the slightest from the spirit of the invention.

Figure 3:
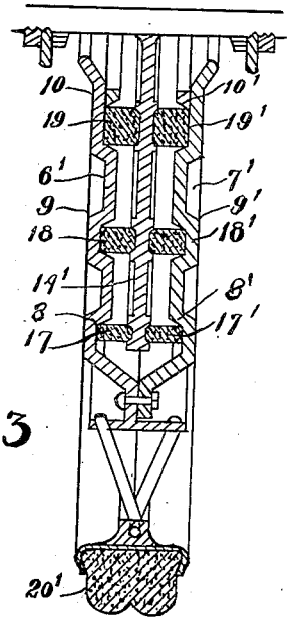
Fig. 3 represents a transverse sectional view through the half of a wheel and showing a modified form of the invention.
Figure 2:
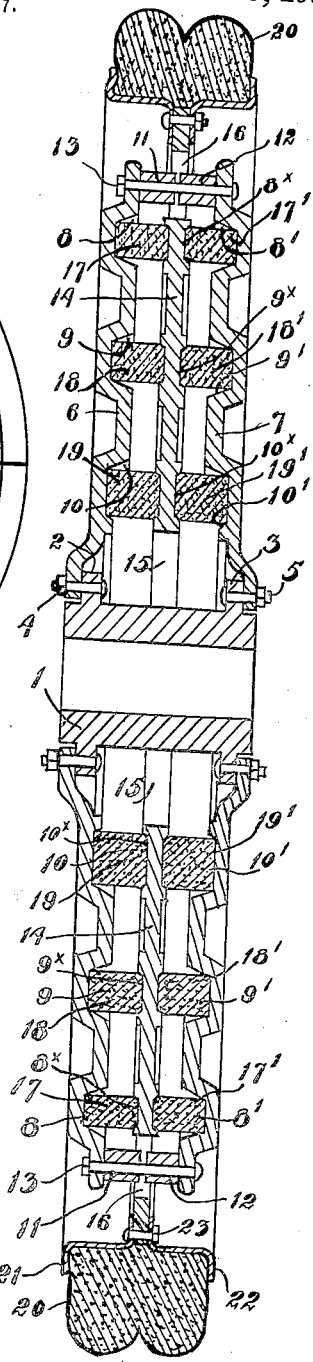
Fig. 2 represents an enlarged transverse sectional view through the wheel.

In such an arrangement the disk would simply extend to and be fastened to the hub and the side plates would be entirely free of the hub and would carry the tread. Such an alternative arrangement is shown in section in Fig. 3 where a half of the wheel appears. In this figure the stationary disk is indicated at 14', the floating side plates at 6' and 7' and the tread at 20', the tread being mounted directly on the plates which are brought together at their outer edges.

What I claim as my invention is:—

A resilient wheel comprising a hub, similar spaced opposing side plates permanently secured to the hub and provided with spaced concentrically arranged beveled channels, a floating disk interposed centrally between the side plates and provided on its opposite faces with concentrically arranged channels opposing the channels of the plates, rubber like concentrically arranged rings interposed between the disk and the side plates and seated in the channels thereof, the channels of the disk tightly hugging the rings but the channels of the plates permitting slight relative lateral movement of the sides of the rings, bolts connecting the side plates, said bolts passing freely through suitable openings provided in the disk and a resilient tread carried by the circumference of the disk.

Signed at Winnipeg, this 15 day of August, 1917.

ROBERT HIRD CLARK.

In presence of—
GERALD S. ROXBURGH,
T. KNEESHAW.